United States Patent [19]

Heiland et al.

[11] Patent Number: 4,970,757
[45] Date of Patent: Nov. 20, 1990

[54] AUTOMATED EXCISION OF UNDESIRABLE MATERIAL AND PRODUCTION OF STARTING MATERIAL FOR RESTRUCTURED MEAT

[75] Inventors: Wolfgang K. Heiland, Trevose; Richard P. Konstance, Philadelphia; James C. Craig, Jr., Maple Glen, all of Pa.

[73] Assignee: The United States of America as represented by the Secretary of Agriculture, Washington, D.C.

[21] Appl. No.: 371,881

[22] Filed: Jun. 27, 1989

[51] Int. Cl.$^5$ ............................................. A22C 25/16
[52] U.S. Cl. ..................................... 452/140; 30/165; 83/360
[58] Field of Search ................... 17/46, 52, 51, 24, 16; 30/165; 83/360, 364, 365

[56] References Cited

U.S. PATENT DOCUMENTS

| | | | |
|---|---|---|---|
| 3,800,363 | 4/1974 | Lapeyre | 17/52 |
| 3,851,074 | 11/1974 | Gillespie | 426/231 |
| 3,930,991 | 1/1976 | Gillespie | 209/3 |
| 4,209,878 | 7/1980 | Albert | 17/52 |
| 4,210,677 | 7/1980 | Huffman | 17/45 |
| 4,557,019 | 12/1985 | Van Deuanter et al. | 17/52 |
| 4,847,954 | 7/1989 | Lapeyre et al. | 17/52 |
| 4,875,254 | 10/1989 | Rudy et al. | 17/52 |

OTHER PUBLICATIONS

Swientek, R. J., "Machine Vision Systems", Food Processing, Apr. 1987, pp. 68–82.
"Update on Meat Restructuring", Memorandum of Screening and Surveillance, USDA, FSIS, and Poultry Techn. Transfer & Assessment, vol. 5, No. 1, Jan. 1986.
"Practical Robots", Memorandum of Screening and Surveillance, USDA, FSIS, Meat and Poultry Technology Transfer and Assessment, vol. 5, No. 1, Jan. 1986.
Noble, B. J. et al. "The Effect of Slice Thickness and Mixing . . .", Journal of Food Quality, 7 (1985) 201–208.
Andres, Cal. "Expanding Applications for Alginate Technologies", Food Processing, Feb. 1987, p. 30.
"Flow Facts Food Applications", 4 pages, from Flow Systems Inc., Kent, Washington, dated Nov./Dec. 1985.
"Flow Fact Robotics Applications", 2 pages from Flow Systems Inc., Kent, Washington.
"Flow Systems", 2 pages, from Flow Systems Inc., Kent, Washington.
"Cutting Through Problems with the Flow Systems Waterknife TM", 8 pages from Flow Systems Inc., Kent, Washington.
Smith, D. R., "Restructured Meat Products: a review", Food Technology in Australia, vol. 36(4), Apr. 1984.
Seideman, S. C. et al., "Restructured Red Meat Products: In Review", Journal of Food Quality 6(1983) 81–101.
"The Ross TC700 and TC700M Tenderizers", Ross Industries Inc., Midland, Virginia.
"Bettcher Model TR-2 Tend-R Rite Mechanical Tenderizer", Maintenance and Operating Manual, Bettcher Industries, Inc., Vermillion, Ohio.

Primary Examiner—Willis Little
Attorney, Agent, or Firm—David R. Sadowski; M. Howard Silverstein

[57] ABSTRACT

The present invention is drawn to various aspects of automated excision of undesirable material (and optionally excision of bone) from meat, and automated production of starting material for restructured meat, including: (a) an apparatus and method generally drawn to, optical detection of the location of undesirable material in meat, communication of information regarding the location of the undesirable material to a control means, and excision of the undesirable material from the meat using a high pressure water jet controlled by the control means; (b) a bone location sensor and method of bone location sensing, each employing a plurality of needles, and; (c) a multiple blade slicer.

15 Claims, 5 Drawing Sheets

Figure 4
(82, 83 & 84 OMITTED)

Figure 5

AUTOMATED EXCISION OF UNDESIRABLE MATERIAL AND PRODUCTION OF STARTING MATERIAL FOR RESTRUCTURED MEAT

FIELD OF THE INVENTION

The present invention relates to processes and apparatuses for automated excision of undesirable material and automated production of starting material for restructured meat (e.g. beef, such as steaks or roasts, beef chuck, lamb, chicken, pork, etc.) products.

BACKGROUND AND SUMMARY OF THE INVENTION

Restructuring of meat simply refers to combining pieces of meat into a desired shape, e.g. steaks and roasts (see "Update on Meat Restructuring" in Memorandum of Screening and Surveillance, USDA, FSIS, Meat and Poultry Technology Transfer and Assessment, Vol. 5, No. 1, published Jan. 1986, incorporated herein by reference). Obviously such combining is most desirably performed in a manner to provide restructured meat products which have pleasing flavor, appearance, texture, and masticatory properties, at the lowest possible cost. The restructuring process itself, that utilizes starting material has been well publicized, see e.g. "Restructured Meat Products: A Review", by D. R. Smith in *Food Technology in Australia*, Vol. 36(4) Apr. 1984, pages 178–182, and "Restructured Red Meat Products: In Review" by S. C. Seideman et al, in *Journal of Food Quality* 6(1983) 81–101, both incorporated herein by reference. In the process of restructuring, large pieces of flaked lean meat are mixed with finely ground objectionable tissue (gristle and fat) and certain binders. This mixture is subsequently subjected to high pressure while being formed into desired shapes. A final cleaving to desired thickness yields the restructured end product. Presently, production of starting material for restructured meat is typically carried out manually. However, such manual operations suffer from the drawbacks of: (1) being labor intensive and therefore expensive; (2) incurring quality control problems (from factors such as, worker fatigue, subjective evaluation, operator error) which adversely affect consumer acceptance of the restructured meat products, and; (3) producing starting material at much lower throughput rates then can be achieved with automated systems.

The present invention avoids the drawbacks of the prior art by: requiring substantially less labor (and thereby lower cost of labor), improving reliability, producing higher quality control (i.e. providing objective, accurate and reliable quality), and permitting much higher throughput speeds then are possible using manual preparation; thus providing higher quality starting material at a substantially lower cost. These advantages of the present invention, as well as other advantages which will be apparent from a reading of the ensuing description, are accomplished by:

A method of optically detecting undesirable material in meat and excising the undesirable material, which method includes, optically detecting with mechanical optical detection means (i.e. as opposed to human vision) a location of undesirable material in meat, communicating information regarding the location of the undesirable material in the meat from the mechanical optical detection means to control means, and excising said undesirable material from the meat with a high pressure water jet controlled by the control means.

A second aspect of the present invention which relates to an apparatus for detection and excision of undesirable material from meat including:

mechanical optical detection means (i.e. mechanical, as opposed to human vision) for optical detection of the location of undesirable material in meat, means for producing a high pressure water jet, and control means, operably connected to both the mechanical optical detection means and the means for producing a high pressure water jet, for receiving information regarding the location of the undesirable material in meat from the mechanical optical detection means and for controlling the means for producing a high pressure water jet to excise the undesirable material from the meat.

A third aspect of the present invention relates to a textural detector apparatus which includes:

a plurality of needles, retaining means for retaining all the needles so that each of the needles is individually displaceable along its longitudinal center axis, and means, operably associated with the needles, for detecting whether or not each said needle is displaced along its longitudinal center axis.

A fourth aspect of the instant invention pertains to an analogous process which comprises:

providing a plurality of needles, providing retaining means for retaining all the needles so that each of the needles is individually displaceable along its longitudinal center axis, and detecting whether or not each of the needles is displaced along its longitudinal center axis.

A fifth aspect of the present invention relates to a highly advantageous and unobvious multiple blade slicer which includes, a cutting table dimensioned and configured to retain material to be sliced, automatic clamping means, operatively associated with said cutting table, for securely clamping said material to be sliced with automatic adjustment to the shape of said material, while said material to be sliced is retained by said cutting table, and slicing means including a plurality of cutting blades for slicing said material to be sliced while it is retained by said cutting table and clamped by said automatic clamping means.

DESCRIPTION OF THE PREFERRED EMBODIMENTS

Initially, a first aspect of the present invention will be described with reference to FIGS. 1 (illustrating a plan view) and 2 (illustrating a cross-section of the apparatus of FIG. 1 taken through line 1—1). In operation, initially a human operator designated 1 in FIG. 1 tends a multiple blade slicer 2 which cuts slices designated 3 from a piece of meat designated 4 (e.g. beef, roasts and square-cut chuck, lamb, pork, etc.). A distribution conveyor 5 (which may for example be an endless belt conveyor equipped with a smooth (e.g. sufficiently smooth to permit meat slices to be slid therefrom) top belt 6) conveys the meat slices 3 to the input side of six process conveyors designated 11 through 16. While six process conveyors are shown for purposes of illustration, any number of such process conveyors may be used. Examples of a sanitary conveyor with a smooth stainless steel belt which may be used in the present invention, include conveyors available from Sandvik Process Systems, Inc., Totowa, N.J. (conveyors are typically custom fabricated from standard components to fit a specific application). Alignment of the meat slices 3 with the process conveyors 11 through 16 is accomplished by six automatic stops designated 7 operated by cylinders 9 via pivotally mounted connecting arms designated 10. At predetermined time intervals, six transfer cylinders 8 push (i.e. slide) the meat slices 3 off distribution conveyor 5 unto their corresponding process conveyors 11 through 16. In the meantime, multiple blade slicer 2 has cut six more meat slices 3 to be conveyed to their proper position on distribution conveyor 5. On the process conveyors 11 through 16, which are equipped with open mesh needle (i.e. spiked) conveyor belts 17 (an example of such a belt which is commercially available is the Audobon Metalwove pinbelt), the meat slices 3 are first impressed onto the needles or pins of belts 17 by rollers 18. Next, the meat slices pass under two types of detection means: (1) a mechanical optical detection means designated 19 (i.e. mechanical in the sense of being related to machinery or tools, as opposed to human vision) for the detection of undesirable material such as fat, gristle, tendon, etc., which may for example be an optical scanner, such as the conventional commercially available scanner available from Sortex North America, Sacremento, CA or Minolta Corp., Ramsey, N.J. (such a mechanical optical detection means may for example include, (a) an imaging sensor, (b) a light source, (c) an image processor, (d) a vision module, (e) means for connection to a miniprocessor, and (f) an operator interface, as referred to in "Machine Vision Systems" by R. J. Swientek, *Food Processing*, Apr. 1987, pages 68–82, which is incorporated herein by reference), and; (2) a mechanical (i.e. mechanical in the sense of being related to machinery or tools) bone detection means, designated 20, for mechanically detecting the location of bone in meat. Such mechanical bone detection means may include e.g. sonar scanners and textural scanners. Examples of sonar scanners which may be used in the present invention include conventional commercially available sonar scanners, from Renco Corp. located in Minneapolis, MN or Ultran Laboratories, State College, PA. An example of a textural detector is described hereinafter in regard to instant FIG. 5. When the bone may be left in the final product (e.g. in super trimmed meats) only detection by said mechanical optical detection means is needed. The information from the mechanical optical detection means, or from both the mechanical optical detection means and mechanical bone detection means, is communicated to, stored, and processed in, a conventional miniprocessor (not shown), such as those available from International Business Machines (i.e. IBM), Digital Equipment Corporation (i.e. DEC) or Hewlett Packard (i.e. HP), and used to control movement i.e. thus constituting control means (e.g. in two dimensions of a plane located over and parallel to the belt) of robotic heads 21 which carry conventional means (including nozzles) for producing a high pressure water jet (e.g. Waterknife TM) designated 22 e.g. Waterknives TM and robotic heads (for example the "X-Y Table") available from Flow Systems, Inc., Kent, Washington. Water may be fed to all of the water jets 22 from a single high pressure pump 23 (which may for example be an 11-X series pump available from Flow Systems, Inc., Kent, Washington). While it is of course understood that pump 23 is in fluid communication with each of the water jets 22, means for providing such communication are not shown in FIGS. 1 and 2 for simplicity of illustration. Excising of objectionable tissue (e.g. bone, fat, gristle, tendon) is done by these water jets 22 at a very high speed while the meat slices 3 are moving with the process conveyors (i.e. process conveyors 11 through 16 may run continuously) under general control of a human process supervisor 24 who operates master console 25. As the meat slices come to the end 26 of process conveyors 11 through 16 all soft tissue remains stuck to the needles of conveyor belts 17 as these belts turn over and around drive pulleys 27. The excised bones, however, fall off onto a bone conveyor 28 (which may e.g. be an endless belt conveyor such as those available from Sandvik Process Systems, Inc.. Now, devoid of bones, the meat slices 3 continue on the underside of process conveyors 11 through 16 until they are above take-away conveyor 29. At this point, a curtain of air blows down from blowers 30 (e.g. a blower available from Buffalo Forge Co.) and through each of the belts 17. This action strips all soft tissue from the needles of belts 17 and the boneless meat slices 3 fall onto take-away conveyor 29. The combined discharge from all six process conveyor's soft tissue is sorted by discharge operator 31 who picks the red meat matrix from take-away conveyor 29 and places it on red meat conveyor 32 that takes it to a chunking operation. The undesirable material (e.g. fat, gristle and tendon) continue on take-away conveyor 29 to a grinding or presort operation. Subsequently, the undesirable material and meat may be recombined to form restructured meat i.e. in operably associated means for recombining the undesirable material and meat to form restructured meat.

Process supervisor 24 also monitors bone conveyor 28 and transfers from bone conveyor 28 to take-away conveyor 29 any red meat that inadvertently falls off ends 26 of process conveyors 11 through 16 prematurely. Conversely, discharge operator 31 transfers bone from take-away conveyor 29 to bone conveyor 28 if, for some reason, it failed to fall off ends 26 of process conveyors 11 through 16. Referring in greater detail to FIG. 2, starting from the left of FIG. 2, an automatic stop 7 is shown in an open position. Actually, automatic stop 7 in line with the last process conveyor 17 would normally be closed, unless, due to a malfunction in one of the six process lines some of the meat slices 3 have to be dumped off the end of the distribution conveyor 5 into a container 33 (FIG. 1). With automatic stops 7 lowered (i.e. in the "down" position) the stops retain the meat slices lined-up with their corresponding process conveyors. As these slices 3 are pushed off conveyor 5 by transfer cylinders 8, the slices slide down a ramp 34 onto their process conveyors 11 through 16. As the needles of conveyor belts 17 of conveyors 11 through 16 grab the meat slices 3, they are conveyed under rollers 18. After detection of undesirable material by detection means 19 and 20, the water jets 22 carried by robotic heads 21 excises all undesirable material. As the meat slices are conveyed around ends 26 of process conveyors 11 through 16 bones drop onto bone conveyor 28 and soft tissue remains stuck to the needles of belts 17. The soft tissue is then ejected from said belt by an air curtain from blowers 30 and/or a comb 35.

To guard against possible harm to humans, the water jets 22 may be enclosed by a safety shield 36, interlocked through switches and normally closed solenoid valves (not shown) to form a fail-safe system with the high pressure water to the water jets 22. Sanitary conditions of each process conveyor 11 through 16 are maintained by a plurality of features. First, the jets from the water jets 22 and some subsequent drippings from the underside of chuck slices 3 are collected in drain pan 37 which is equipped with a wash-down flume 38 across its high ridge 39. As required, bacteriacides may be added to this water which leaves the drain pan 37 at its lowest point 40. This effluent contains the material lost in the kerf produced by the water jets 22 and must be treated in order to meet EPA guidelines before final discharge.

Sanitizing of the process conveyor belts 17 is accomplished in a multiple station cleaning unit 41 above pan 42. The multiple station cleaning unit 41 includes spray nozzles arranged on the inside of open mesh needle belt 17, spraying various solutions continuously through said belts into various drain compartments of pan 42. These solutions are: bacteriacidal cold water rinse from nozzle 43; hot water from nozzles 44 and 45; steam from nozzle 46 for sterilization; chilled water cooling spray from nozzle 47, and; cold dry air blast from nozzle 48. Finally, belts 17 are cooled to a temperature at or somewhat below the processing temperature through heat transfer from belts 17 to the take-up pulley 49, which is kept cold by circulating chilled fluid (such as a mixture of water and ethylene glycol) through its hollow center. While the complete processing line is operated during two consecutive shifts (shifts #1 and #2), the shutdown during the third shift is utilized to thoroughly clean and sterilize all equipment. Maintenance and repair work can also be done during the third shift. Access to the equipment for conducting these operations is provided through steps 50 entering under distribution conveyor 5 at egresses 51. Sanitary cleaning of the sides of drain pans 37 and 42 may be performed manually by partially rolling these pans, 37 (on rollers 130 and 131) and 42 (on rollers 132 and 133) from under process conveyors 11 through 16 to provide ready access to the interior of said pans.

Figure 3:
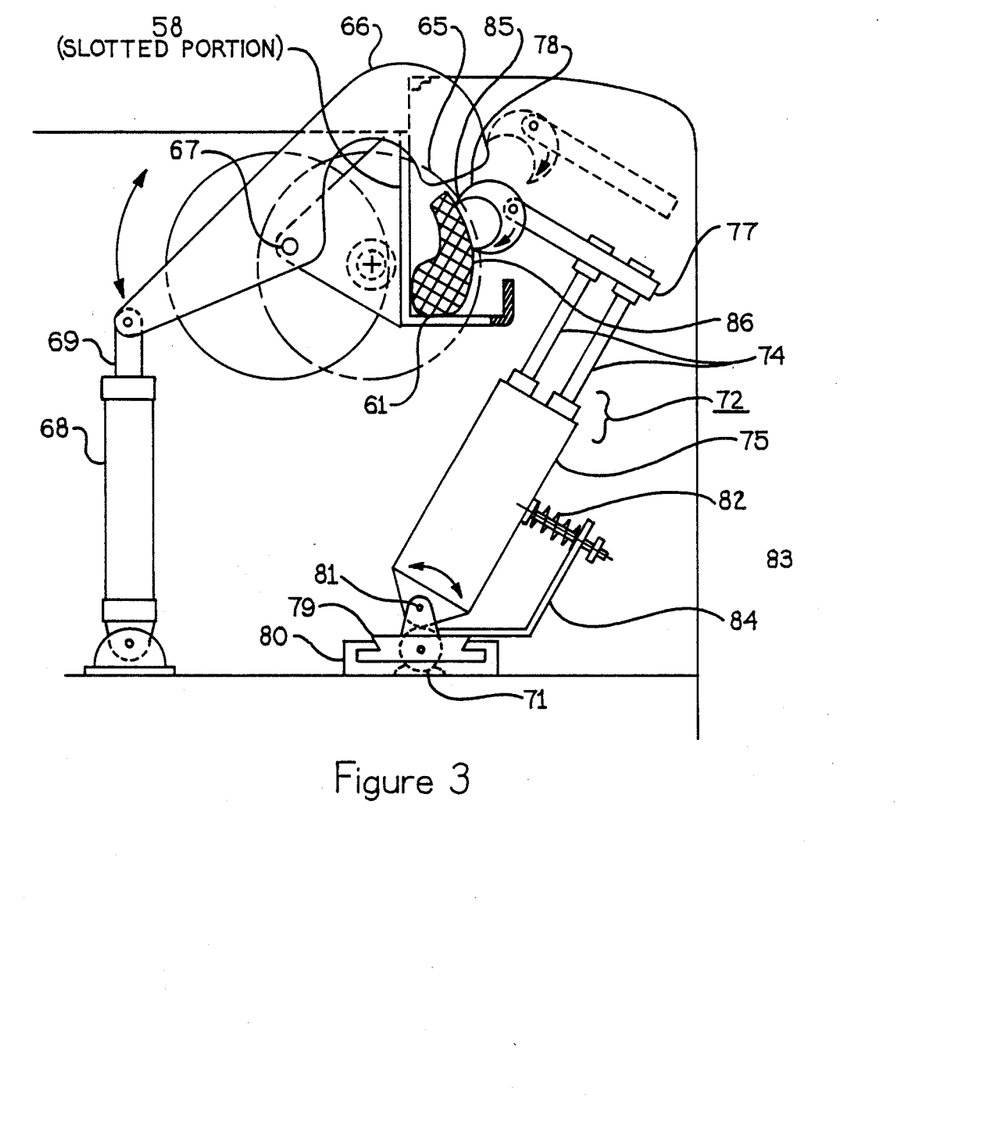
FIG. 3 is a cross-section taken along line 2—2 of FIG. 1, of the multiple blade slicer of the present invention.
Figure 4:
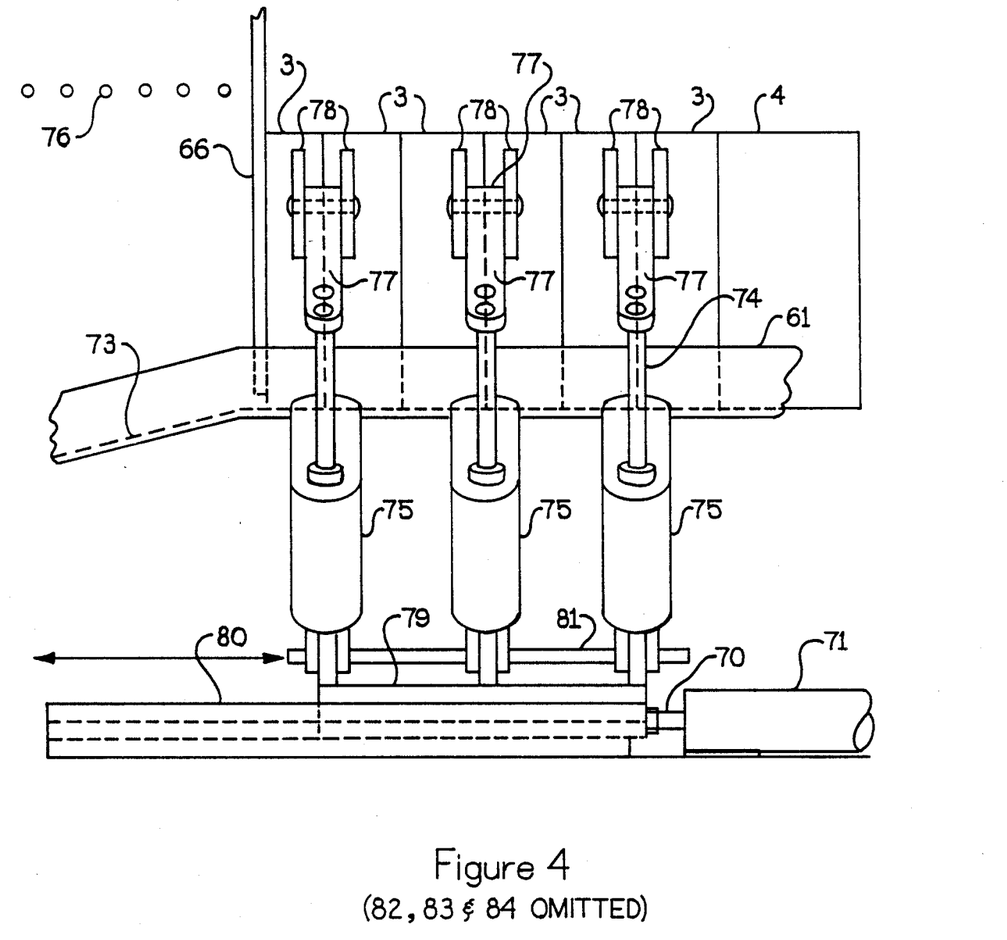
FIG. 4 is a side view of the multiple blade slicer of the present invention, as viewed in the direction of arrow 3 of FIG. 1.

Additional features of the multiple blade slicer 2 and its operation will now be described in reference to FIGS. 1, 3 (an elevation, partly in section along line 2—2 of FIG. 1) and 4 (an elevation viewed in the direction of arrow 3 of FIG. 1). The multiple blade slicer constitutes slicing means, including a plurality of cutting blades, for slicing material to be sliced while the material is retained by the cutting table 61 and clamped by the automatic clamping means. A steady supply of square-cut meat 4 is brought to the multiple blade slicer 2 by means of a feed conveyor 52. At the end of feed conveyor 52 the meat 4 slides down a chute 53 and comes to rest against retractable stop 54, controlled by operator 1 via a foot switch (not shown). Depressing this foot switch causes the piston rod 55 of feed cylinder 56 to retract. Push plate 57, firmly attached to the end of piston rod 55 and guided by the top edge of fence 58, retracts with said rod. When this push plate 57 is fully retracted, stop 54 drops down until its forward lip 59 is flush with the bottom edge 60 of chute 53 and resting on the top edge of fence 58. Operator 1 now pulls a piece of meat 4 toward himself/herself, dropping it onto the cutting table 61. The cutting table is dimensioned and configured to retain material to be sliced. In doing so, he/she makes certain that ribs (if any) face the fence 58 and the split backbone (if any) is resting squarely on the cutting table 61. In the case of a square cut chuck, depending on whether a particular chuck was from the left or right side of the animal, the fifth rib will be facing forward or backward. Now, the operator 1 releases the foot switch, which causes the stop 54 to rise, and activates mechanical feeding means to automatically feed material to be sliced to the cutting table i.e. piston rod 55 of cylinder 56 and push plate 57 move forward and thereby push the next piece of meat 4 against the end of the previous piece of meat 4, which is now being sliced.

Figure 1:
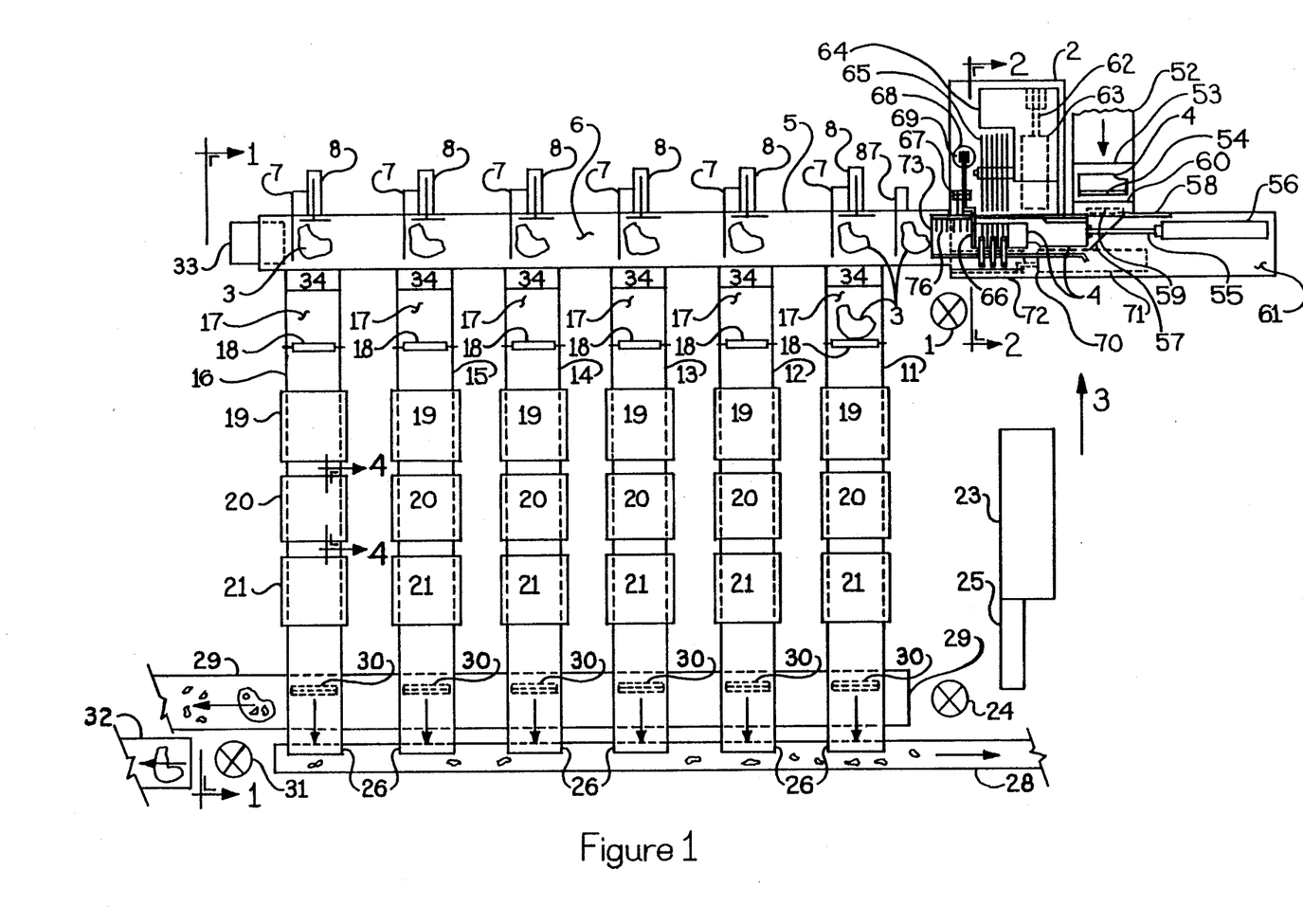
FIG. 1 is a plan view of an apparatus of the present invention.
Figure 2:
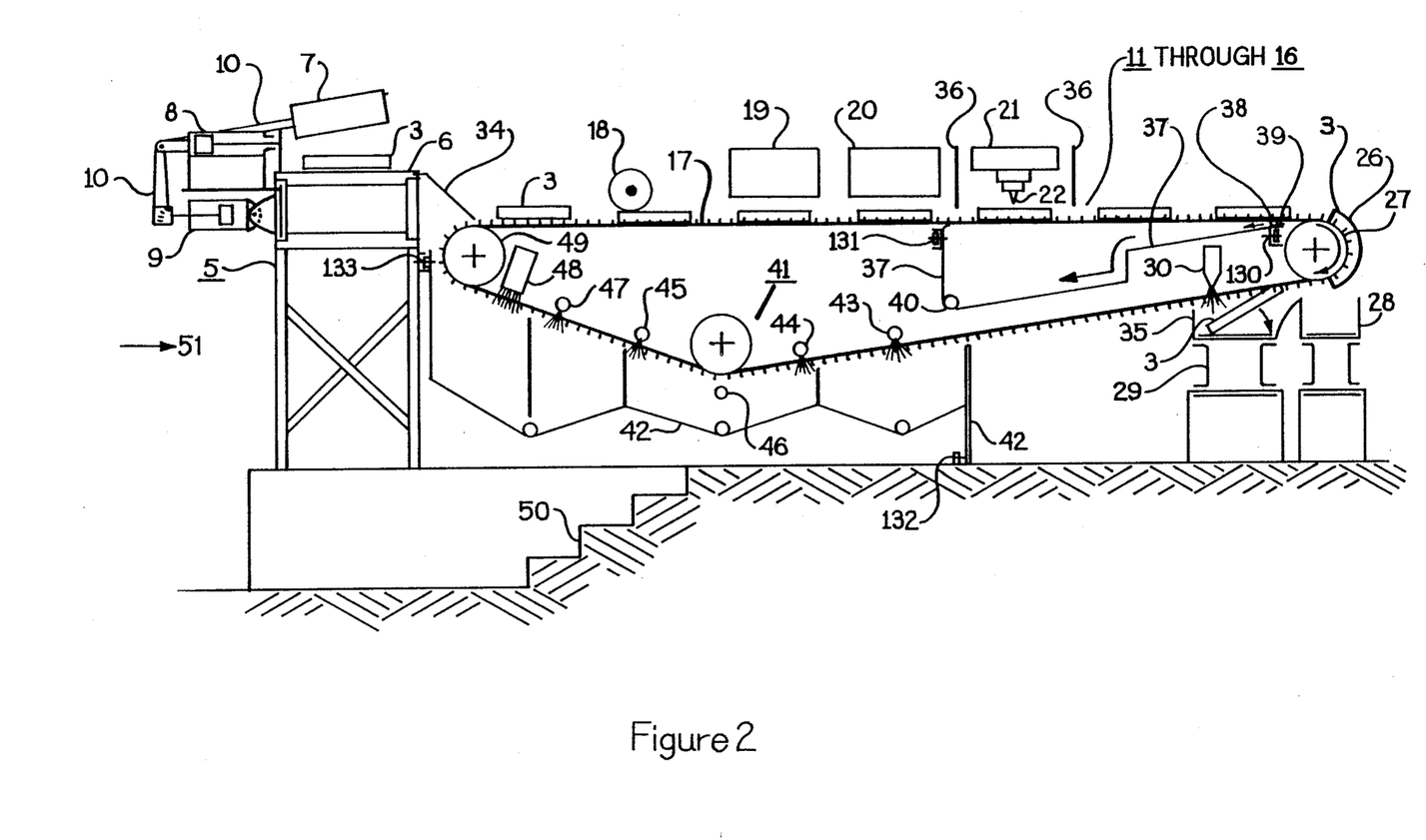
FIG. 2 is a cross-sectional view of the apparatus of FIG. 1, taken along line 1—1 of FIG. 1.

At the end of the slicing stroke piston rod 62 of hydraulic or pneumatic cylinder 63 extends at high speed returning the cutting head 64 carrying circular knife set 65 (i.e. a plurality of cutting blades) to the position shown in FIG. 1. Alternatively, band saws may be used in place of said circular knives. Now, stop 66, pivoting on stop center 67 is raised by hydraulic or pneumatic cylinder 68 as its piston rod 69 retracts. Extension of piston rod 70 of hydraulic or pneumatic cylinder 71 moves the hold-down assembly 72 to the left, moving the stack of (e.g. six) meat slices 3 with it, until hold-down assembly (i.e. automatic clamping means) 72 and the stack of meat slices are above chute 73 (FIG. 4). As soon as these meat slices 3 clear stop 66, extension of piston rod 69 of cylinder 68 lowers stop 66. An additional extension of rod 55 of cylinder 56 causes push plate 57 to slide the next piece of meat 4 and the remainder of the previous piece of meat 4 to the left (as viewed in FIG. 1) until stop 66 is contacted.

In the meantime, piston rods 74 of twin hydraulic or pneumatic cylinder 75 extend, and aided by comb 76 release the chuck slices 3. Attached to a first (e.g. the top as viewed in FIG. 3) end of piston rods 74 is a bar 77 which has pivotally mounted on opposite sides of its second end a pair of two-toothed jaws 78, which are weighted in such a way that they pivot counterclockwise (as viewed in FIG. 3) to the position depicted in FIG. 3 when piston rods 74 are fully extended.

Next, retraction of piston rod 70 of cylinder 71 returns the hold-down assembly 72 to the position depicted in FIG. 1 i.e. in front of the circular knife set 65. The hold-down assembly (i.e. automatic clamping means) includes three pivotally (e.g. clevis-mounted) twin hydraulic or pneumatic cylinders 75 arranged side-by-side on a common slide 79, the common slide being: (1) guided in stationary housing 80, and; (2) slideable with respect to said stationary housing. While pivoting on a common center rod 81, the three twin cylinders 75 are each individually supported by a spring 82 and stop 83 against a common slotted bracket 84. The combination of these features provide the flexibility required to firmly clamp pieces of meat 4 of varying sizes and shapes without interfering with, or getting into the path of, the circular knife set 65. Retraction of piston rods 74 causes left (as viewed in FIG. 3) tooth 85 of jaws 78 to contact the piece of meat 4. Continued retraction of cylinder rods 74 causes the jaws 78 to pivot until the right (as viewed in FIG. 3) tooth 86 also contacts the piece of meat 4 and, the piece of meat 4 is held-down with a controlled force. Thus, the automatic clamping means securely clamps the material to be sliced, with automatic adjustment to the shape of the material, while the material is retained by the cutting table. The multiple blade slicer 2 is now ready to cut the next stack of meat slices by retracting piston rod 62 of cylinder 63 at a controlled cutting rate. By stepping on a second foot switch (not shown), operator 1 raises gate 87 and orients and spaces the meat slices 3 as the distribution conveyor 5 distributes the meat slices 3 to the six processing conveyors 11 through 16.

Detailed features of the mechanical bone detector 20 will now be described with reference to FIG. 5, a longitudinal elevation, mostly in cross section along line 4—4 of FIG. 1. A stationary frame 88 supporrted on form columns 89 from the side frames (not shown) of process conveyors 11 through 16 is equipped with horizontal, channel-shaped tracks 90 on both sides of process conveyors 11 through 16 and rigidly attached to columns 89. The movable portion, cradle 91 of mechanical bone detector 20 is supported on each side by two wheels 92 operating in tracks 90. This gives the cradle 91 one degree of freedom: the travel along the longitudinal axis of process conveyors 11 through 16. The frame 93 of cradle 91 is equipped with four air cylinders 94 rigidly bolted within the four corners 95 of cradle 91. Attached to the piston rods 96 of air cylinders 94 is the textural detector 97 itself, an electromechanical device. Air cylinders 94 provide the textural detector 97 with one degree of freedom up and down. Centered below the four air cylinders 94 are four rods 98 guided in four bearing housings 99 which are rigidly attached to cradle frame 93 and each contain two bearings 100. Housing 101 of textural detector 97 is equipped with four upper tabs 102 and four lower tabs 103. The upper tabs 102 have clevises 104 for attaching cylinder rods 96 by means of pins 105. The lower tabs 103 act as stops for collars 106 which in turn are rigidly attached to rods 98. The portion of rods 98 extending above these collars 106 form lower guides for compression springs 107. The upper ends of compression springs 107 are guided by stubs 108.

Figure 5:
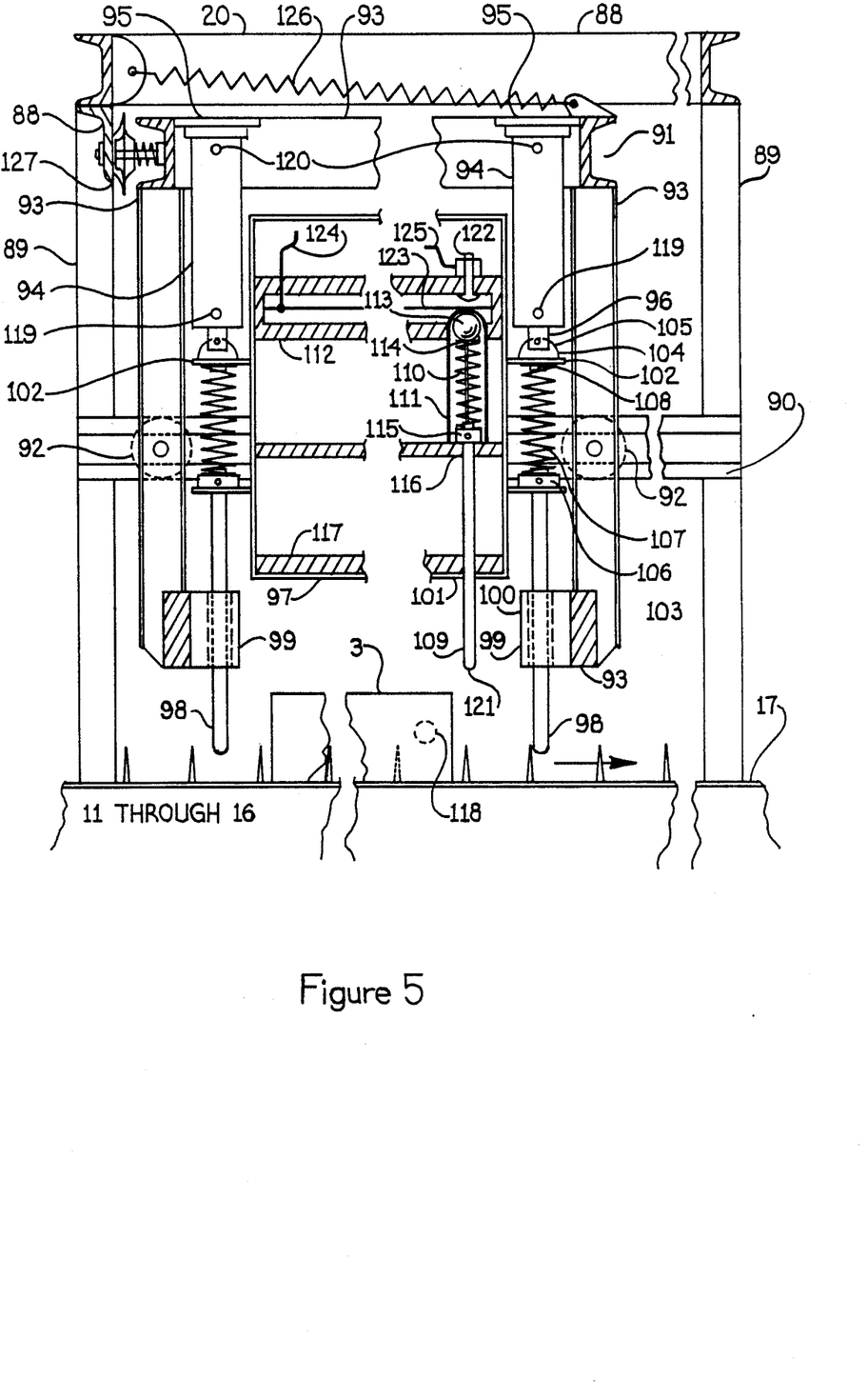
FIG. 5 is a cross-sectional view taken along line 4—4 of FIG. 1, of the textural detector of the present invention.

Located in housing 101 and protruding downward from it are a plurality of bone detection needles 109, which may be arranged side-by-side in a rectangular array e.g. with seven needles per square inch (only one such needle is shown in FIG. 5 for simplification of illustration) in staggered rows. Each needle 109 may be operably associated with biasing means for applying force to each needle in a first direction which coincides with the longitudinal center axis of each needle. In the embodiment depicted in FIG. 5 said first direction extends downwardly through the longitudinal center axis of each needle. Such biasing may for example be provided by individually spring loading each needle with a compression spring 110. Each spring may be located in an electrically non-conductive guide 111, which in turn is guided in an electrically non-conductive bearing plate 112. Preloading of springs 110 is accomplished by means of balls 113 and strings 114. Balls 113 center the top ends of springs 110 while their lower ends rest on collars 115 which in turn are rigidly attached to needles 109. Needles 109 are guided in holes of a top bearing plate 116 and bottom bearing plate 117 made of a suitable bearing material (e.g. polytetrafluoroethylene), thus cooperating with other apparatus elements to provide retaining means for retaining all said needles so that each said needle is individually displaceable (i.e. moveable) along its longitudinal center axis e.g. as viewed in FIG. 5 a vertical axis extending through the center of needle 109.

Operation of the mechanical bone detection means 20 is as follows: the detection process is initiated when the left to right movement (as viewed in FIG. 5) of meat slice 3 imbedded in needles of conveyor belt 17 (i.e. providing holding means for holding material) blocks the line of sight of the stationary electric eye 118. This causes a 4-way solenoid valve (not shown) to switch compressed air from ports 119 to ports 120 while exhausting ports 119 of the four air cylinders 94, resulting in a downward extension of piston rods 96. This action moves the complete textural detector 97 downward. After moving a short distance, downward movement of the four rods 98 is stopped as rods 98 make contact with both outside edges of conveyor belt 17. Now cradle 91, and with it the textural detector 97, start moving to the right (as viewed in FIG. 5), in synchronization with conveyor belt 17. As the textural detector continues its downward movement, tabs 102 also move downward, compressing springs 107. Next, the bottom tips 121 of needles 109 make contact with slice 3 and, if they do not encounter bone, penetrate slice 3. At maximum depth of penetration air cylinders 94 reach the end of their strokes. At this time, the needle tips 121 are located just above conveyor belt 17.

When a needle 109 encounters a bone, downward movement of needle 109 is stopped. This also stops downward movement of guide 111 until its spherical top end pushes flexible foil 123 into contact with individual switch contact 122. The flexible foil 123 is the common switch contact for all needles 109. This completes an electrical circuit between points 124 and 125, thereby detecting whether or not each needle is displaced along its longitudinal center axis e.g. displacement of each needle a predetermined distance (i.e. a distance sufficient to bring the electrical contacts together) in a second direction which is opposite to the aforementioned first direction. In the embodiment depicted in FIG. 5, the second direction extends upwardly through the longitudinal axis of each needle.

The aforementioned completing of an electrical circuit between points 124 and 125 is registered and stored in the aforementioned miniprocessor and subsequently used to control operation of the robotic heads for excision of undesirable material by the means for producing a high pressure water jet. Once contact is made, it remains made with all overtravel absorbe by compression spring 110. Preloading of compression spring is chosen in such a way that it slightly exceeds the force required for a needle 109 to penetrate muscle tissue.

When the trailing edge of slice 3 moves past electric eye 118 it reestablishes line of sight. This causes the 4-way solenoid valve to change state and the ports 119 and 120 of air cylinders become switched thereby moving the textural detector 97 upward. This action first extracts all needles 109 from slice 3 and second, extension spring 126 returns cradle 91 to the position shown, as soon as rods 98 disengage from conveyor belt 17. As cradle 91 returns to the position shown, a pneumatic dashpot 127 brings cradle 91 to a gentle stop. When the leading edge of the next slice 3 interrupts the light beam of electric eye 118 the detection process is repeated.

Alternatively, in lieu of the multiple blade slicer 2, the meat slices could be cut one at a time on conventional, but automatic saws. Each of the process conveyors 11 through 16 would have such a saw on its feed end. This would eliminate need for the distribution conveyor 5. Feed conveyor 52 would be arranged at a right angle to the process conveyor and one operator 1 would load, align and clamp the square-cut chucks starting with process conveyor 11. Each saw would cut up to 30 slices from each chuck in six minutes, allowing up to one minute per process line for operator 1. This way, both versions have the same production rate with the same number of operators.

COST COMPARISON TO MANUAL OPERATION

The following cost calculations are based on an average square-cut chuck weighing 85 pounds, 15 pounds of which are bones. The fat content of the remaining 70 pounds is assumed to be low enough so that all undesirable material, removed either manually or automatically, can be ground and added back during the restructuring process. The restructuring costs are common to both methods and are not included in the comparison. Building costs and their operation are essentially the same for both methods, and are also omitted. It is further assumed that the gross labor rates (base pay plus all fringe benefits) are $35,000 per year ($16.80 per hour).

The Manual Operation: Based on estimated production rates, manual deboning and removal of objectionable tissues requires 20 minutes per chuck. Twenty meat cutters working two 8-hour shifts produce 16.8 million pounds per year (2 shifts/day × 20 cutters/shift × 3 chucks/hour × 70 lb/chuck × 8 hours/day × 250 days/year) at a cost of $1.4M (40 cutters × $35,000 per cutter). The labor cost per pound is: $1,400,000/16,800,000 lbs = $0.08/lb.

The Automatic Operation: The automatic line has an output equal to the above manual operation (12% of the chucks from a processor killing 4000 head of cattle in two shifts) of 16.8 million pounds per year. The line starts with a multi-slicer, cutting up to 30 slices, ¾ inch thick, from one chuck per minute. A distribution conveyor feeds 5 slices to each of 6 processing conveyors where the detection and water-knife cutting take place. Each consecutive step on the processing conveyor is accomplished in the allotted 12 seconds. A bone conveyor and two product conveyors complete the line. Installed costs of this equipment are itemized in Table 1. While the line operates fully automatically, 4 operators are stationed at 4 key points (one at the slicer, one at the distribution conveyor, one at the product conveyors and one to supervise the line). Amortizing the equipment cost (Table 1) over 5 years at $100,000 per year and averaging a 10% interest on the equipment costs at $25,000 for each of these five years, yields the following yearly operating costs:

| | | |
|---|---|---|
| 1. Equipment and Interest | $125,000 | |
| 2. Electric Power to Operate Line (100 kwh × $0.05/kwh × 16 hr/day × 250 days/yr) | 20,000 | |
| 3. Labor (4 × 2 shifts × 35,000/yr) | 280,000 | |
| 4. Maintenance, Service and Repair | 50,000 | |
| TOTAL COST PER YEAR | $475,000 | |

Yearly savings of the automatic system over the manual method is therefore $1,400,000 − $475,000 = $925,000.

The processing cost per pound of product is $0.028 ($475,000/16.8M lbs).

Conclusion: The above cost comparison for producing the starting material for restructured beef products from square-cut chucks shows a $0.052 per pound savings for the automatic over the manual method. In a plant producing 16.8 million pounds per year of restructured beef, operating a 2-shift/day 5-day week, one automatic system with four operators would realize a yearly savings of $925,000 over the manual operation employing 20 cutters per shift. Also, it should be noted that the above cost comparison used a constant gross labor rate of $35,000 year, however except for the line supervisor, the other operators require lesser skills than those of a meat cutter, and would therefore command a correspondingly lower salary.

TABLE 1
(EQUIPMENT COST)

| ITEM | EQUIPMENT | COST EA $ × 1000 | NO. RQD | COST $ × 1000 |
|---|---|---|---|---|
| 1 | Slicer (30-cut saw) | 38 | 1 | 38 |
| 2 | Distribution Conveyor | 4 | 1 | 4 |
| 3 | Processing Conveyor | 12 | 6 | 72 |
| 4 | Detector | 25 | 6 | 150 |
| 5 | Microprocessor | 12 | 6 | 72 |
| 6 | Water-Knife Pump | 75 | 1 | 75 |
| 7 | Robot with Jet | 7 | 12 | 84 |
| 8 | Bone Conveyor | 2 | 1 | 2 |
| 9 | Take-Away Conveyor #1 | 2 | 1 | 2 |
| 10 | Take-Away Conveyor #2 | 1 | 1 | 1 |
| | TOTAL | | | 500 |

It should be noted that while the production of starting material for restructured beef products has been described, the same process may be applied for producing well trimmed meat products that are trimmed only on their outside, leaving a narrow band of fat. However, because this requires less sophistication for the detectors and shorter excising cuts by the water jets, the whole line can be operated at a much higher production rate.

It should also be understood, that, while six parallel processing lines are described hereinabove, this number may be varied. This will depend on slice thickness, time required for detecting undesirable material, water jet orifice diameter, as well as the water jet linear excising speed and maximum length of all cuts per slice. Because each processing line carries out steps of detecting, communicating and excising, simultaneous operation of a plurality of processing lines permits a plurality of the detecting, communicating and excising steps to be performed simultaneously.

The foregoing detailed descriptions and examples are given merely for purpose of illustration. Modifications and variations may be made therein without departing from the spirit and scope of the invention which is defined by the claims.

| INDEX OF APPARATUS ELEMENTS DESIGNATED BY A NUMERAL |
|---|
| 1. Human Operator |
| 2. Multiple Blade Slicer |
| 3. Meat Slices |
| 4. Piece of Meat |
| 5. Distribution Conveyor |
| 6. Smooth Top Belt |
| 7. Automatic Stops |

INDEX OF APPARATUS ELEMENTS DESIGNATED BY A NUMERAL
-continued

8. Six Transfer Cylinders
9. Automatic Stop Cylinder
10. Connecting Arm
11. Process Conveyor
12. Process Conveyor
13. Process Conveyor
14. Process Conveyor
15. Process Conveyor
16. Process Conveyor
17. Open Mesh Needle Conveyor Belts
18. Rollers
19. Mechanical Optical Detection Means
20. Mechanical Bone Detection Means
21. Robotic Heads
22. Water Jets
23. High Pressure Pump
24. Human Process Supervisor
25. Master Console
26. End of Process Conveyors
27. Drive Pulleys
28. Bone Conveyor
29. Take-Away Conveyor
30. Blower
31. Discharge Operator
32. Red Meat Conveyor
33. Container
34. Ramp
35. Comb
36. Safety Shield
37. Drain Pan
38. Wash-Down Flume
39. High Ridge
40. Drain Pan Lowest Point
41. Multiple Station Cleaning Unit
42. Pan
43. Nozzle
44. Nozzle
45. Nozzle
46. Nozzle
47. Nozzle
48. Nozzle
49. Take-Up Pulley
50. Steps
51. Egresses
52. Feed Conveyor
53. Chute
54. Retractable Stop
55. Piston Rod
56. Feed Cylinder
57. Push Plate
58. Fence
59. Retractable Stop Forward Lip
60. Bottom Edge of Chute
61. Cutting Table
62. Piston Rod
63. Hydraulic or Pneumatic Cylinder
64. Cutting Head
65. Circular Knife Set
66. Stop
67. Stop Center
68. Cylinder
69. Piston Rod
70. Piston Rod
71. Cylinder
72. Hold-Down Assembly
73. Chute
74. Piston Rods
75. Cylinder
76. Comb
77. Bars
78. Jaws
79. Slide
80. Stationary Housing
81. Common Cylinder Pivot Center Rod
82. Springs
83. Stops
84. Slotted Bracket
85. Left Tooth
86. Right Tooth
87. Gate

INDEX OF APPARATUS ELEMENTS DESIGNATED BY A NUMERAL
-continued

88. Stationary Frame
89. Four Columns
90. Channel-Shaped Tracks
91. Cradle
92. Wheels
93. Cradle Frame
94. Air Cylinders
95. Corners of Cradle
96. Piston Rods
97. Textural Detector
98. Rods
99. Bearing Housings
100. Bearings
101. Housing of Textural Detector
102. Upper Tabs
103. Lower Tabs
104. Clevises
105. Pins
106. Collars
107. Compression Springs
108. Stubs
109. Bone Detection Needles
110. Compression Springs
111. Electrically Non-Conductive Guide
112. Electrically Non-Conductive Bearing Plate
113. Balls
114. Strings
115. Collars
116. Top Bearing Plate
117. Bottom Bearing Plate
118. Stationary Electric Eye
119. Ports
120. Ports
121. Needle Tips
122. Individual Switch Contact
123. Flexible Foil (Common Switch Contact)
124. Electrical Circuit Point
125. Electrical Circuit Point
126. Extension Spring
127. Pneumatic Dashpot
130. Roller
131. Roller
132. Roller
133. Roller

We claim:

1. A method comprising,
optically detecting with mechanical optical detection means the location of undesirable material in meat,
detecting with mechanical bone detection means the location of bone in meat,
said mechanical bone detection means being selected from the group consisting of sonar scanners and textural scanners,
communicating information regarding said location of said undesirable material in said meat from said mechanical optical detection means to control means,
communicating information regarding the location of said bone in said meat from said bone detection means to said control means, and
excising said undesirable material and said bone from said meat with a high pressure water jet controlled by said control means.

2. The method of claim 1 wherein said meat is held on a spiked conveyor belt during said detecting and excising steps.

3. The method of claim 2 further including the step of, conveying said meat on said spiked conveyor belt while said spiked conveyor belt turns over, so that said bones drop from said spiked conveyor belt while soft tissue of said meat remains stuck to said spiked conveyor belt.

4. The method of claim 1 wherein subsequent to said excising of undesirable material, said undesirable material and meat are recombined to form restructured meat.

5. The method of claim 1 wherein a plurality of said detecting, communicating and excising steps are performed simultaneously.

6. The method of claim 1 wherein said mechanical bone detection means is a sonar scanner.

7. The method of claim 1 wherein said step of detecting the location of bone comprises,
providing a plurality of needles,
retaining all said needles so that each said needle is individually displaceable along its longitudinal center axis, and
detecting whether or not each said needle is displaced along its longitudinal center axis as said needles are inserted into meat.

8. The method of claim 7 wherein said needles are arranged side-by-side in a rectangular array.

9. An apparatus comprising,
mechanical optical detection means for optical detection of the location of undesirable material in meat,
means for producing a high pressure water jet, and control means, operably connected to both said mechanical optical detection means and said means for producing a high pressure water jet, for receiving information regarding said location of said undesirable material in meat from said mechanical optical detection means and for controlling said means for producing a high pressure water jet to excise said undesirable material from said meat,
mechanical bone detection means for detecting the location of bone in meat, said mechanical bone detection means being selected from the group consisting of sonar scanners and textural scanners,
means, operatively associated with said bone detection means, for communicating information regarding the location of said bone in said meat from said bone detection means to said control means, and
said control means functioning to receive information regarding said location of said bone in said meat from said bone detection means and for controlling said means for producing a high pressure water jet to excise said bone from said meat.

10. The apparatus of claim 9 further including a spiked conveyor belt means, operably associated with said detection means and means for producing a high pressure water jet, for holding said meat during detection and excising.

11. The apparatus of claim 9 further including operably associated means for recombining said undesirable material and meat to form restructured meat.

12. The apparatus of claim 9 wherein said mechanical bone detection means is a sonar scanner.

13. The apparatus of claim 9 wherein said mechanical bone detection means comprises,
a plurality of needles,
retaining means for retaining all said needles so that each said needle is individually displaceable along its longitudinal center axis, and
means operably associated with said needles for detecting whether or not each said needle is displaced along its longitudinal center axis.

14. The apparatus of claim 14 wherein said plurality of needles are arranged side-by-side in a rectangular array.

15. The apparatus of claim 9 further including, a multiple blade slicer comprising,
a cutting table dimensioned and configured to retain material to be sliced,
automatic clamping means, operatively associated with said cutting table, for securely clamping said material to be sliced with automatic adjustment to the shape of said material, while said material to be sliced is retained by said cutting table,
slicing means including a plurality of cutting blades for slicing said material to be sliced while said material is retained by said cutting table and clamped by said automatic clamping means, and
further including means for conveying material from said multiple blade slicer to said mechanical optical detection means.

* * * * *